(12) United States Patent
Longatte et al.

(10) Patent No.: US 10,479,240 B2
(45) Date of Patent: Nov. 19, 2019

(54) VEHICLE SEAT AND SEAT ELEMENT EQUIPPED WITH A VENTILATION SYSTEM COMPRISING A DUCT

(71) Applicant: Faurecia Sièges d'Automobile, Nanterre (FR)

(72) Inventors: Florent Longatte, Rambouillet (FR); Didier Duriez, Le Plessis-Pâté (FR); Jacques Robert, Marcoussis (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 15/828,341

(22) Filed: Nov. 30, 2017

(65) Prior Publication Data
US 2018/0147962 A1 May 31, 2018

(30) Foreign Application Priority Data
Nov. 30, 2016 (FR) ...................... 16 61672

(51) Int. Cl.
*B60N 2/56* (2006.01)
*B60N 2/70* (2006.01)
*B60N 2/68* (2006.01)

(52) U.S. Cl.
CPC .......... *B60N 2/5621* (2013.01); *B60N 2/565* (2013.01); *B60N 2/5657* (2013.01); *B60N 2/686* (2013.01); *B60N 2/7017* (2013.01)

(58) Field of Classification Search
CPC .... B60N 2/5621; B60N 2/7017; B60N 2/686; B60N 2/565; B60N 2/5657
USPC .......................... 297/180.1, 180.13, 180.14
See application file for complete search history.

(56) References Cited

U.S. PATENT DOCUMENTS

| 2011/0109128 A1 | 5/2011 | Axakov et al. | |
| 2011/0187165 A1* | 8/2011 | Oota | B60N 2/5671 297/180.14 |
| 2011/0260509 A1 | 10/2011 | Siu | |

FOREIGN PATENT DOCUMENTS

| DE | 102009042789 A1 | 5/2011 |
| DE | 102013218696 A1 | 3/2015 |

* cited by examiner

*Primary Examiner* — Justin V Lewis
(74) *Attorney, Agent, or Firm* — Reising Ethington P.C.

(57) ABSTRACT

A seat element that includes a supporting structure, a padding configured to serve as a support for a user, and a ventilation system having at least one fan and a duct defining an air passageway placing the fan and the padding in communication. The duct has a first member and a second member fixed to one another, the first member being arranged between the supporting structure and the padding.

11 Claims, 2 Drawing Sheets

VEHICLE SEAT AND SEAT ELEMENT EQUIPPED WITH A VENTILATION SYSTEM COMPRISING A DUCT

TECHNICAL FIELD

The invention relates to vehicle seat elements, in particular backrests or seating parts, to vehicle seats comprising such elements, and to the methods for manufacturing these elements.

BACKGROUND

A vehicle generally comprises several seats connected to the floor of the vehicle. A vehicle seat usually comprises two separate seat elements: a seating part and a backrest. The seat element comprises a supporting structure and padding. The supporting structure is rigid and directly connected to the floor. Its function is to ensure the mechanical stability of the seat element. The padding is soft and is arranged between the supporting structure and a user of the seat element. The padding thus ensures user comfort. It is usually covered with a cover.

The seat element may also comprise a ventilation system in communication with the padding. The ventilation system comprises at least one fan that is able to blow or suck air into or from a passenger compartment of the vehicle, through the cover and padding. To do this, the padding usually comprises a cavity in which are housed a fan and a member which compartmentalizes the cavity. Between the fan and the member is arranged a woven spacer, also called a "3D mesh". It is this spacer that allows the flow of air from the fan to the padding.

However, the seat element is therefore relatively complex to manufacture because it requires several assembly steps. In addition, the woven spacer generates a relatively high air resistance, which has the effect of reducing the air flow entering the padding compared to the flow exiting the fan.

SUMMARY

One aim of the invention is to overcome the two aforementioned disadvantages, namely to provide a seat element that is simpler to manufacture and more effective in terms of air flow.

To do this, the invention in at least some embodiments provides a seat element comprising a supporting structure, padding configured to serve as a support for a user, and a ventilation system comprising at least one fan and a duct defining an air passageway placing the fan and the padding in communication, characterized in that the duct comprises a first member and a second member fixed to one another, the first member being arranged between the supporting structure and the padding. The first member therefore contributes both to defining the duct and protecting the padding, as it is interposed between the supporting structure and the padding. The padding thus does not rub against the supporting structure of the seat, which reduces noise in the vehicle interior and prevents padding wear.

The second member primarily defines the shape of the duct and allows preserving most of the air flow between the fan and the padding.

In addition, the seat element is simpler to manufacture because it comprises fewer parts than the seat element of the prior art.

In various embodiments of the seat element according to the invention, one or more of the following provisions may possibly also be used:
- at least one among the first and second members comprises a thermoformed material;
- one will note more generally that the first and second members may comprise the same thermoformed material, which may in particular be a polyolefin material or fluidtight non-woven material providing an appropriate compromise between rigidity and flexibility;
- the first member may also comprise a different material than the second member: in fact, the first member may comprise for example a thermoformed fluidtight non-woven material while the second member comprises a polyolefin material;
- the first and second members respectively comprise two facing walls defining the duct, the wall of the first member being planar and the wall of the second member having a non-planar shape; the first member is thus simpler to shape, as only the second member needs to be shaped to the desired shape of the duct;
- the second member comprises on its periphery a flanged edge fixed directly to the wall of the first member; this flanged edge, which is planar, allows directly fixing the entire periphery of the second member to the first member so as to define the duct and ensure a seal between the two members;
- the first member comprises a housing accommodating the fan;
- the second member comprises a plurality of orifices forming air inlets and/or outlets;
- the plurality of orifices is arranged symmetrically, the airflow characteristics of the duct then being easy to model;
- the second member has a symmetrical shape and comprises two distinct arms which join together at one end and extend so that a central area of the padding is in direct contact with the first member; thus, when the seat element forms a backrest, the spine of the user is not opposite the first member which has a non-planar shape, thus increasing the comfort of the seat element;
- the second member has a general "C" or "U" shape;
- the seat element forms a backrest;
- the seat element forms a seating part.

The invention further provides a seat comprising at least one seat element as described above. The seat is preferably adapted to be a vehicle seat.

Finally, the invention in one or more other embodiments provides a method for manufacturing a seat element as mentioned above, comprising at least the following steps:
- the first and second members are formed and fixed to one another,
- the first and second members are positioned in a mold for the creation of the padding, and
- a material intended for forming the padding is poured into the mold, around the first and second members.

Note that when the first and second members each comprise a thermoformed material, for example a thermoplastic, they can be formed using a twin-sheet thermoforming process. In this case, the first and second members are formed and attached to one another simultaneously. The first and second members may thus be formed as one piece. The first and second members may also be glued to one another.

Of course, the different features, variants, and/or embodiments of the invention may be associated with one another in various combinations, to the extent that they are not incompatible with or exclusive of one another.

BRIEF DESCRIPTION OF DRAWINGS

The invention will be better understood and other features and advantages will be further apparent from reading the following detailed description of an embodiment, given by way of non-limiting example, with reference to the following appended figures.

DETAILED DESCRIPTION

For the sake of clarity, only the elements useful to understanding the described embodiments are represented and will be detailed.

Figure 1:
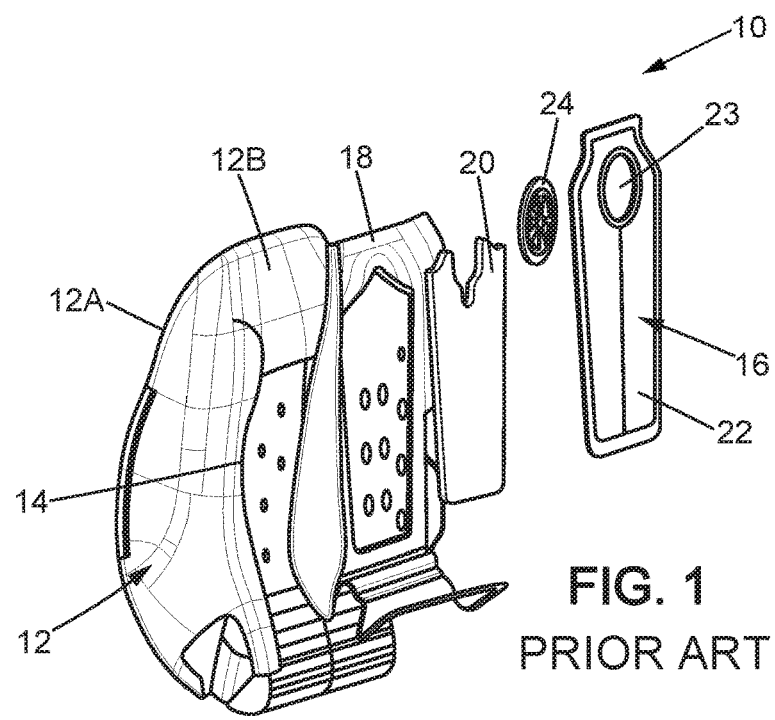
FIG. 1 illustrates a seat element according to the prior art.

Represented in FIG. 1 is a seat element 10 for a motor vehicle seat according to the prior art. The seat element is a backrest.

The seat element 10 comprises a padding 12 which has a front face 12A intended to be in contact with the back of a user and a rear face 12B. The rear face 12B of the padding 12 comprises a cavity 14 which accommodates the ventilation system 16. The seat element further comprises an air-permeable cover, not shown, which covers the padding 12.

The ventilation system 16 comprises a structural reinforcement 18 whose function is to reduce wear to the pad 12 related to friction of the pad on a supporting structure, not shown, a sealing wall 22 which closes off the cavity 14, and a woven spacer 20 arranged between the structural reinforcement 18 and the sealing wall 22. The structural reinforcement 18 comprises a plurality of orifices 19 forming air passageways between the woven spacer 20 and the padding 12. The sealing wall 22 comprises an orifice 23 for housing a fan (not shown), and which is positioned by means of a plastic part 24 fixed to the sealing wall 22. Thus, the fan is in air communication with the padding 12 via the woven spacer. The fan can thus blow air into a passenger compartment comprising the seat element 10 or, conversely, can suck air through the cover in order to improve user comfort. The structural reinforcement 18 and the sealing wall 22 are intended to be in contact with the supporting structure. According to the prior art, it is the woven spacer, which has a high air resistance, which establishes the air communication between the fan and the padding 12. This causes a significant pressure drop.

Figure 2:
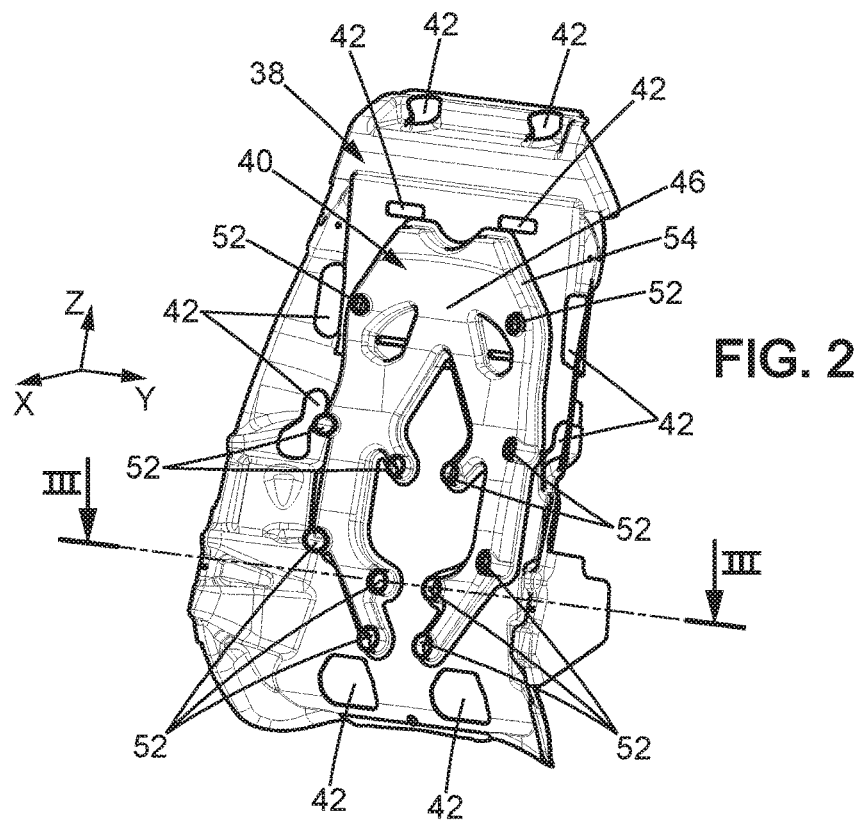
FIG. 2 represents a perspective view of a ventilation system according to one embodiment of the invention.

A seat element 30 according to one embodiment of the invention will now be described with reference to FIGS. 2 to 5. The seat element 30, particularly visible in FIG. 3, here is a backrest of a vehicle seat. Represented in FIG. 2 is a ventilation system 32 according to an embodiment of the invention. The ventilation system 32 replaces the ventilation system 16 described above.

Figure 3:
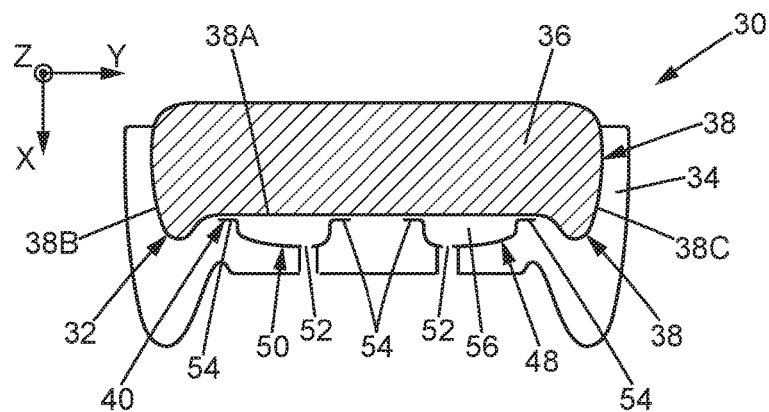
FIG. 3 is a sectional view along line III-III, in which the ventilation system is part of a seat element according to an embodiment of the invention.

The seat element 30, visible in FIG. 3, therefore comprises the ventilation system 32, a padding 34, and a supporting structure 36. Represented in FIG. 3 is a direction (X) which runs from the rear to the front of the vehicle when the seat element 30 is arranged in the vehicle. Also represented is a vertical direction (Z), which runs from the bottom to the top, and a direction (Y) perpendicular to these two directions (X) and (Z), which runs from the right to the left of the vehicle. One will note that plane (XZ) is a plane of symmetry for the seat element 30.

The padding 34 is soft and configured to support a user. The supporting structure 36 gives the seat element 30 the necessary structural support. In addition, the supporting structure 36 is adapted to be connected to the floor of the passenger compartment of the vehicle, for example by means of rails. The supporting structure 36 may be of any type and may in particular comprise a metal frame.

Figures 4, 5:
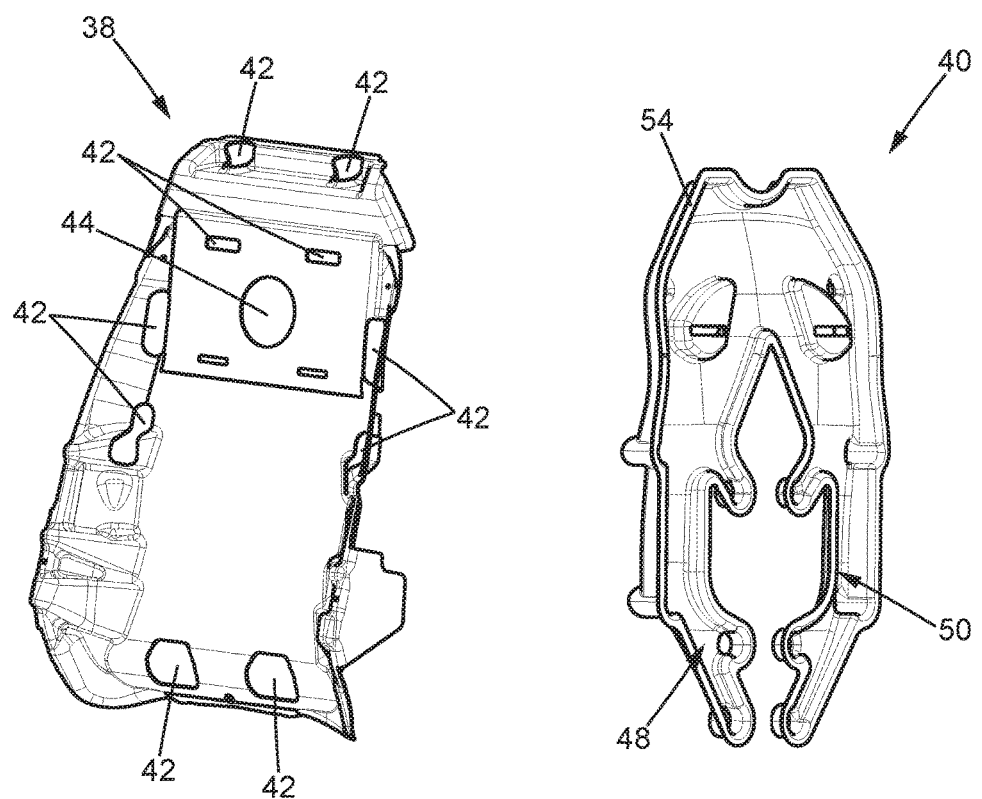
FIGS. 4 and 5 illustrate respective perspective views of a first member and a second member of the ventilation system.

The ventilation system 30 comprises a first member 38, also visible in FIG. 4, and a second member 40, also visible in FIG. 5.

As can be seen in FIG. 3, the first member 38 is arranged between the padding 34 and the supporting structure 36. In addition, it is placed on the supporting structure 36 and held against it by means of a cover, not shown, and directly supports the padding 34. Thus, the first member 38 interfaces the padding 34 and the supporting structure 36. To do this, the first member 38 has dimensions adapted to prevent any direct contact between the padding 34 and the supporting structure 36. The first member 38 thus protects the padding 34 from the supporting structure 36. The second member 40 is fixed to a face of the first member 38, opposite to the face that is in contact with the supporting structure 36. The second member 40 is thus in direct contact with the padding 34 and the first member 38, but not with the supporting structure 36.

The first member 38 has a main wall 38A and two side walls 38B, 38C. The main wall 38A is substantially flat and extends in plane (YZ). The side walls 38B, 36C extend in parallel and symmetrically from the main wall 38A, in plane (XZ). In addition, as can be seen in FIG. 4, the first member 38 comprises a plurality of housings 42 which are in the form of through-holes and which serve to house other systems of the seat element 30 (for example a headrest or a massage system). In addition, the first member 38 comprises a housing 44 which is in the form of a circular through-hole and which has the function of accommodating a fan 46 (whose location is shown in FIG. 2).

The second member 40 has a symmetrical shape relative to plane (XZ), and extends primarily in plane (YZ). It has a non-planar three-dimensional shape. In addition, it has a general "C" or "U" shape. It comprises a left arm 48 and a right arm 50 which extend longitudinally in direction (Z). These two arms 48 and 50 meet at one of their ends, in this case the upper end in the vertical direction (Z), and thus each forms a separate arm of the "C" or "U". In addition, the second member 40 comprises a plurality of through-holes 52 arranged symmetrically on the left 48 and right 50 arms. In addition, the second member 40 comprises a flanged edge 54 along its entire periphery, with reference to plane (YZ). This flanged edge 54 is planar so as to fulfill the function of a surface for attachment to the first member 38 as described below.

This is why, as illustrated in FIGS. 2 and 3, when the ventilation system 32 is assembled, the first 38 and second 40 members are attached to one another so that the second member is arranged facing the fan 46 and the flanged edge 54 of the second member 40 is directly attached to the main wall 38A of the first member 38. The periphery of the second member 40 is therefore in direct contact with the main wall 38A of the first member 38. A free space between the flanged edge 54 of the second member and two facing faces of the first 38 and second 40 members defines a duct 56 which places the fan 46 and the padding 34 in air communication, via the through-holes 52 of the second member 40. Moreover, one will note that the padding 34 comprises perforations arranged opposite the through-holes 52 of the second member 40 so as to place the passenger compartment and the fan 46 in air communication.

The duct 56 thus defines an air passageway placing the padding 34 and the fan 46 in communication. The duct 56 comprises the first member 38 and the second member 40. A face of the first member 38 which contributes to defining the duct 56 is planar. A face of the second member 40 which contributes to defining the duct 56 is non-planar in shape, and gives its shape to the duct 56. It is therefore the second member 40 which is formed to the shape one wishes to give to the duct 56.

In addition, as illustrated in FIGS. 2 and 3, the left 48 and right 50 arms extend in such a way that a central area of the padding 34 is in direct contact with the planar main wall 38A of the first member 38. Thus, the user's spine will not feel the second member 40 which has a non-planar shape, improving user comfort.

In addition, as can be seen in FIG. 2, the left 48 and right 50 arms of the second member 38 have a non-constant cross-sectional area and therefore have variable dimensions. This cross-sectional area is larger near the fan 46 and gradually decreases according to the number of orifices 52 and their respective positions and dimensions. This variation in the cross-sectional area is aerodynamically optimized so that the speed of the air flow along the duct 56 is substantially uniform.

Note also that the fan can be used to blow air through the padding 34 into the passenger compartment of the vehicle, or conversely to suck air. In the first case, the orifices 52 form an air outlet of the ventilation system 30. In the second case, the orifices 52 form an air inlet of the ventilation system 30.

Preferably, the first 38 and second 40 members comprise the same material, in this case a thermoformed material which is advantageously a polyolefin or sufficiently rigid fluidtight non-woven material.

Alternatively, the first 38 and second 40 members comprise two different materials. The first member 38 may in particular comprise a non-woven material or a thermoformed fluidtight sheet.

A method for manufacturing the ventilation system 30 will now be described.

First, the first 38 and second 40 members are shaped and fixed to one another. When the first 38 and second 40 members comprise the same thermoplastic material, they are shaped and assembled simultaneously, for example by a method known by the name "twin-sheet". To do this, two sheets of thermoplastic material are provided, which are formed according to the aforementioned method. Otherwise, the first 38 and second 40 members are shaped separately and fixed to one another by any means. For example, the first 38 and second 40 members are fixed via a bonding process, or an assembly process by means of hot melt, ultrasonic welding, or sewing.

Next, the first 38 and second 40 members are arranged in a mold for the creation of the foam padding 34.

Then, a foam in liquid form which is intended for forming the padding 34 is poured into the mold, around the first 38 and second 40 members. The foam is allowed to expand until the padding 34 is formed.

Next, the padding 34 is assembled to the supporting structure 36.

Of course, many variants can be applied to the invention without departing from its scope.

The seat element 30 may be a seating part.

The second member 40 may have any shape.

The first 38 and second 40 members may be formed as one piece. The first 38 and second 40 members may be integral with one another.

The invention claimed is:

1. Seat element comprising a supporting structure, padding configured to serve as a support for a user when located between the supporting structure and the user, and a ventilation system comprising at least one fan and a duct defining an air passageway placing the fan and the padding in communication, wherein the duct comprises a first member and a second member fixed to one another, the first member being arranged between the supporting structure and the padding, the second member being arranged between the first member and the padding and having a symmetrical shape comprising distinct left and right arms which join together at one end and extend separately along the first member on opposite sides of a plane of symmetry of the second member such that a central area of the padding between the left and right arms is in direct contact with the first member.

2. Seat element according to claim 1, wherein at least one among the first and second members comprises a thermoformed material and/or a polyolefin material and/or a fluidtight non-woven material.

3. Seat element according to claim 1, wherein the first and second members respectively comprise two facing walls defining the duct, the wall of the first member being planar and the wall of the second member having a non-planar shape.

4. Seat element according to claim 1, wherein the first member comprises a housing accommodating the fan.

5. Seat element according to claim 1, wherein the second member comprises a plurality of orifices forming air inlets and/or outlets.

6. Seat element according to claim 1, wherein the second member has a general "C" or "U" shape.

7. Seat element according to claim 1, forming a backrest.

8. Seat comprising a seat element according to claim 1.

9. Method for manufacturing a seat element according to claim 1, comprising at least the following steps:
   fixing the first and second members to one another,
   positioning the first and second members in a mold, and
   pouring a material in the form of liquid foam intended for forming the padding into the mold, around the first and second members.

10. Seat element according to claim 1, wherein the plane of symmetry is perpendicular to a transverse direction of the seat element, the left and right arms of the second element being spaced apart in the transverse direction.

11. Seat element according to claim 1, wherein the plane of symmetry of the second member is a plane of symmetry of the seat element that divides the seat element into symmetric left and right portions.

* * * * *